United States Patent
Dhaliwal et al.

[15] 3,679,684
[45] July 25, 1972

[54] YELLOW PIGMENTS

[72] Inventors: Pritam Singh Dhaliwal, Belleville; Edward E. Jaffe, Union, both of N.J.

[73] Assignee: E. I. du Pont de Nemours and Company, Wilmington, Del.

[22] Filed: April 17, 1969

[21] Appl. No.: 817,187

[52] U.S. Cl. ..........................260/272, 260/287, 106/288 Q
[51] Int. Cl. .......................................................C07d 33/56
[58] Field of Search........................260/272, 281, 287 A, 551

[56] References Cited

UNITED STATES PATENTS

| | | | |
|---|---|---|---|
| 2,681,931 | 6/1954 | Jenkins.............................260/557 B |
| 3,223,700 | 12/1965 | Klavehn et al......................260/557 B |
| 2,079,940 | 5/1937 | Kunz....................................260/272 |
| 2,506,023 | 5/1950 | Jenny et al............................260/272 |
| 2,864,823 | 12/1958 | Schwechten et al. ..............260/272 X |
| 2,925,421 | 2/1960 | Pizzarello ............................260/272 |
| 3,483,179 | 12/1969 | Braun ................................260/289 X |
| 3,509,156 | 4/1970 | Wei ......................................260/287 |

OTHER PUBLICATIONS

Ingold " Structure & Mechanism in Organic Chemistry," Cornell Univ. Press, 1953, pp. 758 and 759 (1953).

*Primary Examiner*—Donald G. Daus
*Attorney*—Frank R. Ortolani

[57] ABSTRACT

Yellow pigments are produced by reacting a 3-alkoxy-carbonyl-2,4-dihydroxyquinoline, such as 3-ethoxycarbonyl-2,4-dihydroxyquinoline, and a diaminoanthraquinone, such as 1,5-diaminoanthraquinone, 1,4-diaminoanthraquinone, or 1,1-diamino-4,4'-dianthraquinonyl. Typical compounds of this invention are:

1,5-Bis(2,4-dihydroxyquinoline-3-carboxamido)anthraquinone which may be represented by the following structural formula

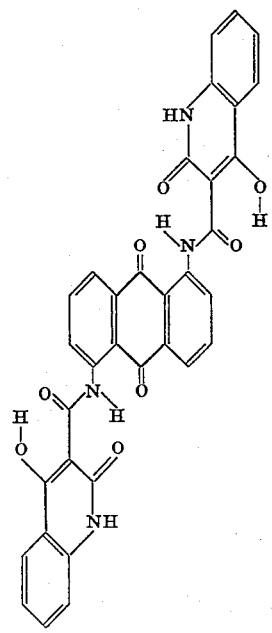

1,4-bis(2,4-dihydroxyquinoline-3-carboxamido)anthraquinone which may be represented by the following structural formula

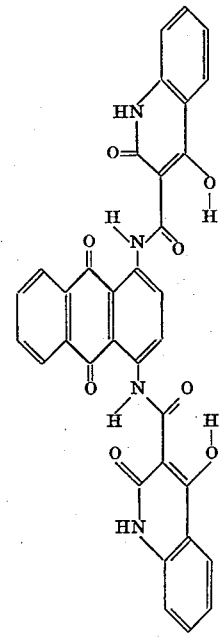

and 1,1'-bis(2,4-dihydroxyquinoline-3-carboxamide)4,4'-dianthraquinonyl which may be represented by the following structural formula

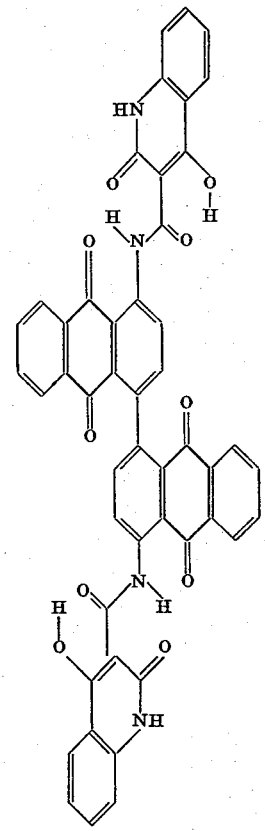

7 Claims, No Drawings

YELLOW PIGMENTS

BACKGROUND OF THE INVENTION

This invention relates to novel compounds produced by reacting a 3-alkoxycarbonyl-2,4-dihydroxyquinoline and a anthraquinone; and more particularly to yellow pigments of excellent lightfastness and of excellent resistance, even at high temperatures, to migration and to bleed in conventional coating compositions, plastics, rubber and paper.

Most yellow pigments available today are useful only in specific applications due to inherent deficiencies. For example, inorganic pigments exemplified by the various forms of lead chromate and products derived therefrom are toxic, show poor resistance to certain chemical agents, lack the necessary lightfastness required for high quality finishes, and are not sufficiently transparent for use in popular metallic finishes. Cadmium Yellows are excessively opaque and weak. The well known "Hansa" type monoazo yellows bleed in organic systems and sublime when subjected to baking temperatures. The somewhat superior diazo yellows of the benzidine class do not exhibit adequate lightfastness for high quality finishes demanded by the automotive industry. These diazo yellows are still not sufficiently bleed resistant for certain critical applications in organic systems. A metallized azo pigment yellow commonly known as "Green Gold" is excessively green for use in yellow pigments and lacks the heat resistance necessary for many applications. Another organic yellow generally known as "Anthrapyrimidine Yellow" is not sufficiently transparent for use in metallic finishes.

In contrast to prior yellows, the yellow pigments of this invention are applicable to all general purposes. These compounds exhibit superior lightfastness, are suitable for use in metallic paints, resist bleeding and migration in organic solvents even at elevated temperatures, are non-toxic, show excellent resistance to chemical agents, and are resistant to high temperatures.

Syntheses of amides from aromatic type ester compounds and aromatic amines is usually a difficult reaction. In contrast, the reaction of this invention proceeds with ease to produce the amides of interest. This method of producing these amides is preferred over a preparation involving the corresponding acid chlorides since the acid chloride process requires intermediates which are difficult to prepare.

SUMMARY OF THE INVENTION

The yellow pigments of this invention comprise bis-(2,4-dihydroxyquinoline-3-carboxamido)anthraquinones. These pigments are reaction products of a 3-alkoxycarbonyl-2,4-dihydroxyquinoline and a diaminoanthraquinone. The reaction is carried out by heating the reactants in an inert organic solvent whereupon the pigment, being essentially insoluble, is precipitated from the solution.

DESCRIPTION OF THE PREFERRED EMBODIMENTS

Surprisingly, it has been found that amides can be readily derived from a 3-alkoxycarbonyl-2,4-dihydroxyquinoline through a reaction with selected diamines which proceeds easily to the desired pigments. The 3-alkoxycarbonyl-2,4-dihyroxyquinoline may be represented by the following structural formula:

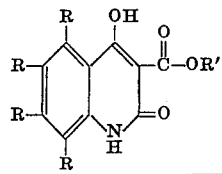

wherein R' is an alkyl group of one to three carbon atoms. 3-Ethoxycarbonyl-2,4-dihydroxyquinoline is preferred since it is easily prepared, e.g. according to J. Chem. Soc. 4289(1955). The R group represents a hydrogen, halogen, lower alkyl or lower alkoxy group or another group which does not interfere with the reactivity of this compound. For purposes of this invention, the lower alkyl and alkoxy groups include substituents having from one to three carbon atoms.

The diaminoanthraquinone compounds may be represented by the following formulas,

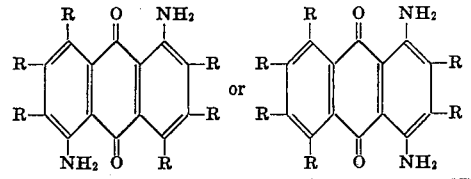

In addition, 1,1'-diamino-4,4-dianthraquinonyl may be used in this invention:

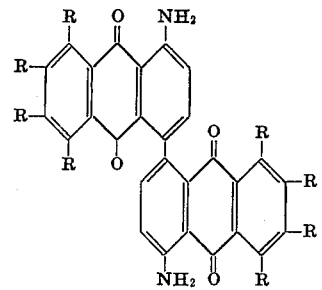

In the above compounds, R is a hydrogen, halogen, lower alkyl or lower alkoxy group, or other substituent which does not interfere with the reactivity of these compounds. The lower alkyl and alkoxy groups include substituents having from one to three carbon atoms.

The products of these reactants are the respective bis(2,4-dihydroxyquinoline-3-carboxamido)anthraquinones. These compounds have unique properties which make them useful as yellow pigments. As yellow pigments, the particle size should usually be less than one micron in diameter or have a surface area greater than 20 square meters per gram.

One method of preparing the novel yellow pigment is by conducting the reaction in a solvent medium and precipitating the insoluble pigment. The selection of the solvent is dependent upon its ability to dissolve the reactants and its ability to function well under the necessary temperature required for the reaction. Trichlorobenzene functions well as the solvent; however, other suitable inert organic solvents, such as chlorobenzene and nitrobenzene, will provide a suitable reaction medium.

The reaction medium is heated to a temperature sufficient to carry out the reaction. The temperature required is dependent upon the particular properties of the reactants and solvent used. Satisfactory results have been obtained using temperatures varying from about 100° C. to 220° C. This variable can be readily determined by those skilled in the art.

The product, upon formation, precipitates from the solution due to its extremely low solubility in the reaction medium. Purification of the pigment can be accomplished by methods familiar to those skilled in pigment technology. For example, recrystallization can be effected by a common sulfuric acid method. Further extraction of impurities can be carried out by subjecting the pigment to a strong polar organic solvent such as N,N'-di-methyl formamide. The method of purification is not critical to this invention, but rather the methods of purification disclosed are illustrative of the ability of this new pigment to be treated conventionally.

In some cases, it may be advantageous to increase the transparency of the pigment. Pigment transparency can be increased by particle size reduction through typical methods such as ball milling in an organic medium, salt milling, acid swelling, as well as other means available to those skilled in the art.

For a clearer understanding of the invention, the following specific examples are given. These examples are intended to

EXAMPLE I

A mixture of 20 parts (0.084 moles) of 1,5-diaminoanthraquinone and 44.0 parts (0.198 moles) of 3-ethoxycarbonyl-2,4-dihydroxyquinoline, and 4700 parts of trichlorobenzene is heated with stirring at 150°–160° C and maintained at this temperature for 3-½ hours. After heating for approximately 30 minutes, a bright yellow solid begins to precipitate from the reaction mixture. After completion of the reaction, the mixture is filtered at 150°–160° C. and the precipitate is washed successively with benzene and alcohol, and dried at 60° C. The yield is 54.3 parts of a yellow solid, which does not melt below 400° C.

A 10-part portion of the product is pulverized and dissolved by stirring in 1000 parts of 96 percent sulfuric acid at 6°–10° C. The acid concentration is gradually lowered to 93 percent by addition of water at such a rate as to maintain the temperature below 10° C. After completion of the addition, the slurry is stirred for an additional 30 minutes. The precipitated sulfate is filtered and washed with 85 percent sulfuric acid until the filtrate is colorless. The sulfate is then treated with ice and water to regenerate the purified pigment. The product is isolated by filtration and then is washed with water until free of soluble sulfate, and finally dried at 60° C. The yield of acid recrystallized pigment (A) is 6.3 parts.

EXAMPLE II

The mixture of 6.3 parts of product A is refluxed in 900 parts of N,N'-dimethyl formamide for one hour. The resulting product (B) is isolated by filtering at 140°–150° C., washing, and drying at 60° C. The yield obtained is 6.0 parts. Product B is then analyzed for nitrogen content.

Found: $N = 9.12\%$
Calculated for $C_{34}H_{20}N_4O_8$: $N = 9.15\%$

The analysis thus confirms the identity of the product as 1,5-bis(2,4-dihydroxyquinoline-3-carboxamido)anthraquinone.

Products A and B are examined by X-ray diffraction. The following table summarizes the interplanar spacings for the two forms calculated from the X-ray diffraction data:

Interplanar Spacings

| Product A Interplanar Spacing A | Intensity | Product B Interplanar Spacing A | Intensity |
|---|---|---|---|
| 6.15 | s | 6.15 | m |
| 5.68 | s | — | - |
| 4.92 | w | 4.62 | w |
| 3.70 | m | 3.56 | s |
| 3.42 | s | 3.42 | w |
| 3.08 | w | 3.10 | w |
| 2.81 | m | 2.34 | vw |
| 1.89 | s | 2.04 | vw |
| 1.81 | s | 1.92 | s |
| 1.72 | s | 1.76 | s |
| 1.60 | s | 1.72 | s | s = strong  m = medium  w = weak  vw = very weak

These results clearly indicate that products A and B are polymorphs and represent distinct crystal phases of 1,5-bis(2,4-di-hydroxyquinoline-3-carboxamido)anthraquinone.

EXAMPLE III

A seven-part sample of product B is milled for 72 hours with 63 parts of hydrated aluminum sulfate and a small amount of tetrachloroethylene as in Example 1 of U.S. Pat. No. 3,030,370. The mill charge is extracted with 5 percent sulfuric acid at above 90° C., filtered, the presscake is washed free of acid and sulfate, and subsequently dried at 60° C. This product (C) showed interplanar spacings similar to those of product B, thus indicating that no phase change has occurred during milling. However, product C is very much more transparent than product B, presumably because of its smaller particle size of greater than 40 square meters per gram.

Products A, B and C are redder than "Green-Gold" (Colour Index 12775), and show comparable strength and intensity thereto. They are much more intense and slightly greener than "Anthrapyrimidine Yellow" (Colour Index 68420). By exposure in a "Fade-ometer," Atlas Model FDA-R, for 300 hours the lightfastness of products B and C in both tint and masstone is comparable to that of "Green-Gold" and "Anthrapyrimidine Yellow." After 500 hours of exposure to a carbon arc "Fade-ometer," the masstones of these samples show significant superiority to "Anthrapyrimidine Yellow." Product C is more transparent than either product B or "Anthrapyrimidine Yellow," and is thus eminently suitable for the preparation of metallized finishes of excellent lightfastness.

EXAMPLE IV

A mixture of two parts of 1,4-diaminoanthraquinone, eight parts of 3-ethoxycarbonyl-2,4-dihydroxyquinoline, and 1100 parts of trichlorobenzene is heated with stirring for 6½ hours at 160°–175° C. After approximately one hour at this temperature, a reddish-yellow solid begins to crystallize from solution. After completion of the heating, the mixture is filtered, and the filter cake is washed successively with trichlorobenzene, benzene, and alcohol. The product is dried at 60° C. The yield is 5.8 parts of a reddish-yellow solid which does not melt below 400° C.

The product is purified by recrystallization from acid in the following manner: A 5.5-part portion of the dried solid is dissolved in 184 parts of 96 percent sulfuric acid by stirring at 6°–10 C. The acid concentration is gradually lowered to 86 percent by addition of water, the rate being such as to maintain the temperature below 10° C. The precipitated sulfate is isolated by filtering and washing with 80 percent sulfuric acid until the filtrate is colorless. The pigment is regenerated by hydrolyzing the sulfate thus obtained with ice and water, filtering, washing free of acid and drying at 60° C. The yield of acid recrystallized product is 3.0 parts.

The acid crystallized pigment is further purified by extraction with N,N'-dimethyl formamide. A mixture of three parts of the pigment is heated with 275 parts of N,N'-dimethyl formamide at reflux temperature. The product is isolated from the hot mixture by filtration, washing, and drying at 60° C. The yield is 2.8 parts.

Analysis:
Found: $N = 9.09\%$
Calculated for $C_{34}H_{20}N_4O_8$: $N = 9.15\%$

The analysis thus confirms the identity of the product as 1,4-bis(2,4-dihydroxyquinoline-3-carboxamido)anthraquinone.

When dispersed in a linseed oil lithographic varnish, the crude compound is found to be a red shade yellow and is found to be much more transparent than "Anthrapyrimidine Yellow." After exposure in a "Fade-ometer" for 300 hours, it shows good light-fastness in masstone and in tint.

EXAMPLE V

A mixture of 4.0 parts of 1,1'-diamino-4,4'-dianthraquinonyl, 7.5 parts of 3-ethoxycarbonyl-2,4-dihydroxyquinoline, and 3150 parts of trichlorobenzene is heated with stirring to reflux and maintained at this temperature for seven hours. After approximately one hour, a reddish-yellow solid begins to precipitate from the reaction mixture. After completion of the heating, the solid is isolated by filtration at 210° C., is successively washed with trichlorobenzene, benzene, and alcohol, and finally dried at 60° C. The yield was 9.0 parts of a reddish-yellow product which does not melt below 400° C.

The product is purified by recrystallization from acid in the following manner. A nine-part portion of the product is pulverized and dissolved with stirring in 368 parts of 96 percent sulfuric acid at 6°–10° C. The acid concentration is gradually lowered to 85 percent by careful addition of water, the rate being such as to maintain the temperature below 10° C. The slurry is stirred at this temperature for 30 minutes. Finally, the mixture is filtered, and the sulfate presscake is washed with 80 percent sulfuric acid until the filtrate is colorless. The pigment is regenerated by hydrolysis of the sulfate with ice and water, and is isolated by filtration, washing acid and sulfate free, and finally drying at 60° C. The yield of acid recrystallized product thus obtained is 4.4 parts.

For analytical purposes this product is subjected to a second acid recrystallization in identical manner and then further extracted with boiling N,N'-dimethyl formamide. The dried product thus obtained is analyzed.

Analysis:
Found: $N = 6.83\%$
Calculated for $C_{48}H_{26}N_4O_{10}$: $N = 6.68\%$ The analysis thus confirms the identity of the product as 1,1'-bis(2,4-dihydroxyquinoline-3-carboxamido)-4,4'-dianthraquinonyl.

The crude pigment, that is the product obtained without further particle size reduction, is a red shade yellow, and much more intense than "Anthrapyrimidine Yellow." It shows good light-fastness in masstone and tint after exposure in a "Fade-ometer" for 300 hours.

We claim:

1. The compound 1,5-bis(2,4-dihydroxyquinoline-3-carboxamido)anthraquinone.

2. The compound 1,4-bis(2,4-dihydroxyquinoline-3-carboxamido)anthraquinone.

3. The compound 1,1'-bis(2,4-dihydroxyquinoline-3-carboxamido)-4,4'-dianthraquinonyl.

4. The compound of claim 1 in a polymorphic modification defined by the following X-ray diffraction data:

| Interplanar spacing, A | Intensity |
|---|---|
| 6.15 | strong |
| 5.68 | strong |
| 4.92 | weak |
| 3.70 | medium |
| 3.42 | strong |
| 3.08 | weak |
| 2.81 | medium |
| 1.89 | strong |
| 1.81 | strong |
| 1.72 | strong |
| 1.60 | strong |

5. The compound of claim 1 in a polymorphic modification defined by the following X-ray diffraction data:

| Interplanar spacing, A | Intensity |
|---|---|
| 6.15 | medium |
| 4.62 | weak |
| 3.56 | strong |
| 3.42 | weak |
| 3.10 | weak |
| 2.34 | very weak |
| 2.04 | very weak |
| 1.92 | strong |
| 1.76 | strong |
| 1.72 | strong |

6. The process of preparing a bis(2,4-dihydroxy-quinoline-3-carboxamido)anthraquinone consisting essentially of mixing a 3-alkoxycarbonyl-2,4-dihydroxyquinoline wherein the alkoxy group has from 1 to 3 carbon atoms and a diaminoanthraquinone selected from the group consisting of 1,5-diaminoanthraquinone, 1,4-diaminoanthraquinone and 1,1'-diamino-4,4'-dianthraquinonyl in an inert organic solvent medium and heating the mixture at a temperature ranging from about 100° C. to 220° C.

7. The process of claim 6 wherein the 3-alkoxy-carbonyl-2,4-dihydroxyquinoline is 3-ethoxycarbonyl-2,4-di-hydroxyquinoline.

* * * * *